United States Patent [19]

Nakajima

[11] Patent Number: 5,115,376

[45] Date of Patent: May 19, 1992

[54] IC CARD EJECTING DEVICE

[75] Inventor: Akira Nakajima, Nara, Japan

[73] Assignee: Sharp Kabushiki Kaisha, Osaka, Japan

[21] Appl. No.: 627,807

[22] Filed: Dec. 13, 1990

[30] Foreign Application Priority Data

Jan. 23, 1990 [JP] Japan .................... 2-5447

[51] Int. Cl.⁵ .............................. H05K 7/16
[52] U.S. Cl. ................... 361/415; 361/392; 361/395; 361/399; 361/413; 211/41; 439/157; 439/160
[58] Field of Search ............. 361/392, 395, 399, 413, 361/415; 211/41; 439/152, 157, 159, 160

[56] References Cited

U.S. PATENT DOCUMENTS

| | | | |
|---|---|---|---|
| 4,620,756 | 11/1986 | Gatti et al. ............... | 439/157 X |
| 4,778,395 | 10/1988 | Narita ....................... | 439/159 X |
| 4,887,188 | 12/1989 | Yoshida et al. ........... | 361/415 X |
| 4,999,744 | 3/1991 | Blankenship .............. | 361/415 |

FOREIGN PATENT DOCUMENTS 60-209989 10/1985 Japan.
1-123267 8/1989 Japan.
1-147457 10/1989 Japan.
2205000A 5/1988 United Kingdom.

Primary Examiner—Leo P. Picard
Assistant Examiner—Paramita Ghosh
Attorney, Agent, or Firm—David G. Conlin; Robert F. O'Connell

[57] ABSTRACT

An IC card ejecting device for selectively ejecting one of two IC cards which are inserted in respective connectors and disposed in parallel to each other side by side. The device comprises a dial which is disposed between the IC cards and movable in a first direction for ejecting one of the IC cards and a second direction opposite to the first direction for ejecting the other of the IC cards. A first pulling out plate has a hook which engages with one of the IC cards. A second pulling out plate has a hook which engages with the other IC card. A first link is arranged between the dial and the first plate in such a way that the first link engages with the first plate and urges it in a direction of pulling out the one of IC cards from the connector when the dial is rotated in the first direction. A second link is arranged between the dial and the second plate in such a way that the second link engages with the second plate and urges it in a direction of pulling out the other of IC cards from the connector when the dial is rotated in the second direction.

6 Claims, 4 Drawing Sheets

IC CARD EJECTING DEVICE

BACKGROUND OF THE INVENTION

1. Field of the Invention

The present invention relates to an ejecting device for selectively ejecting one of two IC cards which are detachably installed within an electronic device such as an electronic notebook, a note word processor, or a laptop computer, in order to provide the device with various functions.

2. Description of the Related Art

Such an IC card ejecting device has two sets of the same ejecting mechanism for two IC cards, respectively, each of which cards is attached to and electrically connected to a printed circuit board through a connector. Each of the two ejecting mechanisms comprises an eject button, an eject link, and an eject plate. When one of the IC cards is to be pulled out, the corresponding eject button for the card is pressed. When the button is pressed, it in turn presses an end of the corresponding eject link which is rotatably installed on an axle attached to the cabinet. Therefore, the link is rotated about the axle, so that the other end of the link is moved in the direction opposite to the pressing direction. The link has a oval hole formed at the end thereof. A pin of the corresponding eject plate is slidably inserted in the oval hole of the link. Therefore, in accordance with the rotation of the link, the eject plate is moved in the card detaching direction so that the IC card is pulled out from the connector by claws formed on an end of the eject plate, which claws are engaging with the edge of the IC card.

However, in accordance with the structure of the ejecting device mentioned above, the eject button, the eject link, and the eject plate have to be prepared for each of respective IC cards, which makes the construction complicated and the cost thereof high. Besides, due to the structure in which the eject buttons are disposed in the lateral sides of the IC cards, it becomes necessary to prepare space for arranging the two buttons in the lateral sides of the cards, which makes the device structure bulky.

SUMMARY OF THE INVENTION

The present invention was made considering the above mentioned problems of the relating structure of the IC card ejecting device.

It is therefore an object of the present invention to realize a compact and simplified structure of an IC card ejecting device for selectively ejecting one of the two IC cards inserted in the electronic apparatus.

The above mentioned object of the present invention can be achieved by an IC card ejecting device for selectively ejecting one of two IC cards which are inserted in respective connectors and disposed in parallel to each other side by side, the device comprising:

a manipulation dial for ejecting one of said IC cards which dial is disposed at a position between said two IC cards and movable in a first direction for ejecting one of the IC cards and a second direction opposite to the first direction for ejecting the other of the IC cards;

a first pulling out plate having a hook piece which engages with one of the IC cards;

a second pulling out plate having a hook piece which engages with the other of the IC cards;

a first link mechanism arranged between the manipulation dial and the first pulling out plate in such a way that the first link mechanism engages with the first pulling out plate and urges the first pulling out plate in a direction of pulling out the one of IC cards from the connector when the manipulation dial is moved in the first direction; and a second link mechanism arranged between the manipulation dial and the second pulling out plate in such a way that the second link mechanism engages with the second pulling out plate and urges the second pulling out plate in a direction of pulling out the other of IC cards from the connector when the manipulation dial is moved in the second direction.

More particularly, the above mentioned object of the present invention can be achieved by an IC card ejecting device for selectively ejecting one of two IC cards which are disposed side by side in parallel to each other and inserted in respective connectors, characterized in that the device comprises:

a disc like single eject dial rotatably disposed between the two IC cards;

a pair of eject link levers disposed in opposite sides of the dial, each link lever being disposed perpendicular to the IC card and having an end pivotted to a device frame and the other end rotatably connected to the dial; and a pair of eject plates each of which is movable toward and away from the connector and has a catch piece for hooking the IC card to pull it out from the connector when the plate is moved away from the connector and a tongue piece which is pushed by the link lever in the direction away from the connector when the lever is rotated by the dial in the direction away from the connector.

In the event that one of the IC cards is to be pulled out, the eject dial is rotated in one direction so that one of the eject link lever which is connected to the dial is rotated about a pivot arranged on the device frame in the direction away from the connector while the other link lever is rotated in the opposite direction toward the connector. The former link lever which is rotated about the pivot in the direction away from the connector pushes the tongue piece of the plate to move in the direction away from the connector so that the catch piece of the plate abuts against the IC card and pulls it out from the connector. In this motion of pulling out the IC card from the connector by the function of one of the link levers, the other link lever is moved away from the tongue piece of the other eject plate so that the other eject plate is disengaged from the connector, thereby only one of the IC cards is pulled out.

An advantage of the above mentioned IC card ejecting device in accordance with the present invention is that the structure is simplified, which makes it possible to reduce the cost of the device, due to the arrangement of the common single manipulation dial which can be rotated in opposite two directions so that the rotation direction of the dial is selectively changed in accordance with the IC card to be ejected.

Another advantage of the above mentioned IC card ejecting device in accordance with the present invention is that a small and compact ejecting device can be realized since the manipulation dial is common for the two IC cards and disposed at a position between the two IC cards.

Further objects and advantages of the present invention will be apparent from the following description of the preferred embodiments of the invention as illustrated in the accompanying drawings.

DESCRIPTION OF THE PREFERRED EMBODIMENTS

Figure 1:
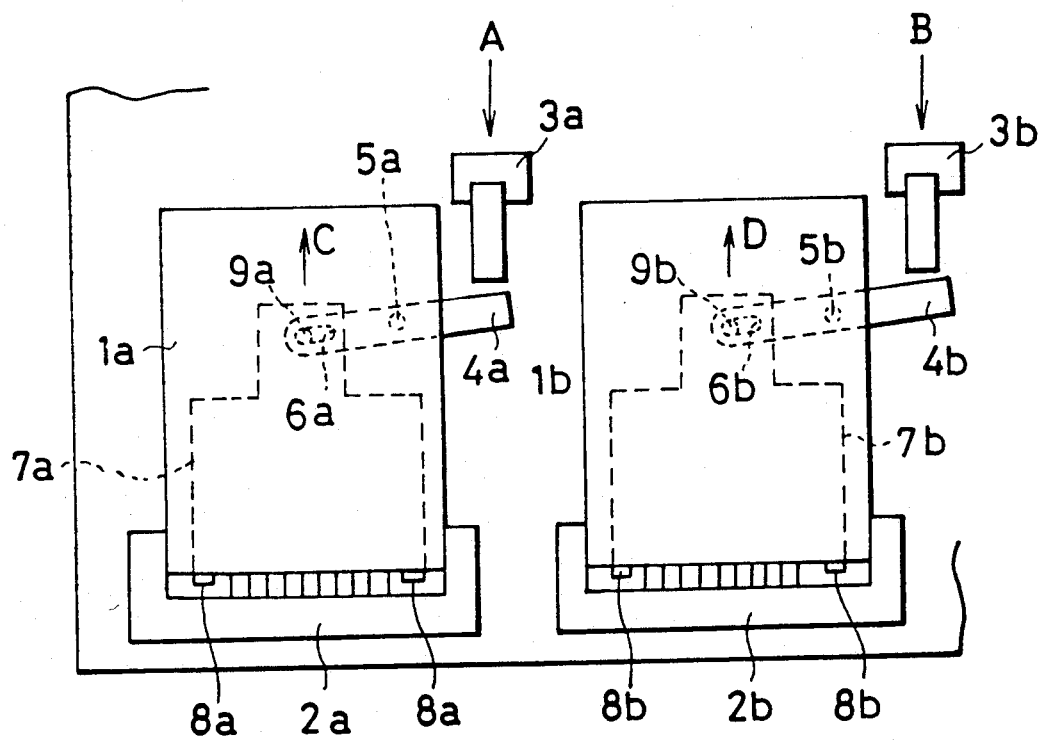
FIG. 1 is a plan view of the IC card ejecting device of the related art.

An embodiment of the present invention is described hereinafter in detail with reference to the drawings in comparison to the related art structure which is also illustrated and described referring to the drawing.

FIG. 1 illustrates a structure of the IC card ejecting device in accordance with the related art. The present invention is improved from the structure of the related art of FIG. 1.

The related art IC card ejecting device, as illustrated in FIG. 1, has two sets of the same ejecting mechanism for two IC cards 1a and 1b, respectively, each of which cards is attached to and electrically connected to a printed circuit board through a connector 2a, 2b. Each of the two ejecting mechanisms comprises an eject button 3a, 3b, an eject link 4a, 4b, and an eject plate 7a, 7b. When one of the IC cards 1a and 1b is to be pulled out, the corresponding eject button 3a, 3b for the card is pressed in the direction of an arrow A, B illustrated in the drawing. When the selected button is pressed, it in turn presses an end of the corresponding eject link 4a, 4b which is rotatably installed on an axle 5a, 5b attached to the cabinet (not shown). Therefore, the link 4a, 4b is rotated clockwise about the axle, so that the other end of the link is moved in the direction opposite to the pressing direction, as illustrated by an arrow C, D. The link 4a, 4b has a oval hole 6a, 6b formed at the end thereof. A pin 9a, 9b is attached to each of the plates 7a and 7b. The pin of the eject plate is slidably inserted in the oval hole of the corresponding link. Therefore, in accordance with the rotation of the link, the eject plate is moved in the card detaching direction so that the IC card 1a, 1b is pulled out from the connector 2a, 2b by claws 8a, 8b formed on an end of the eject plate, which claws are engaging with the edge of the IC card.

However, in accordance with the structure of the ejecting device mentioned above, the eject button 3a, 3b, the eject link 4a, 4b, and the eject plate 7a, 7b have to be prepared for each of respective IC cards 1a and 1b, which makes the construction complicated and the cost thereof high. Besides, due to the structure in which the eject buttons 3a and 3b are disposed in the lateral sides of the IC cards 1a and 1b, it becomes necessary to prepare space for arranging the two buttons 3a and 3b in the lateral sides of the cards 1a and 1b, which makes the device structure bulky.

The above mentioned problems can be obviated by the embodiment of the present invention described below.

Figure 2:
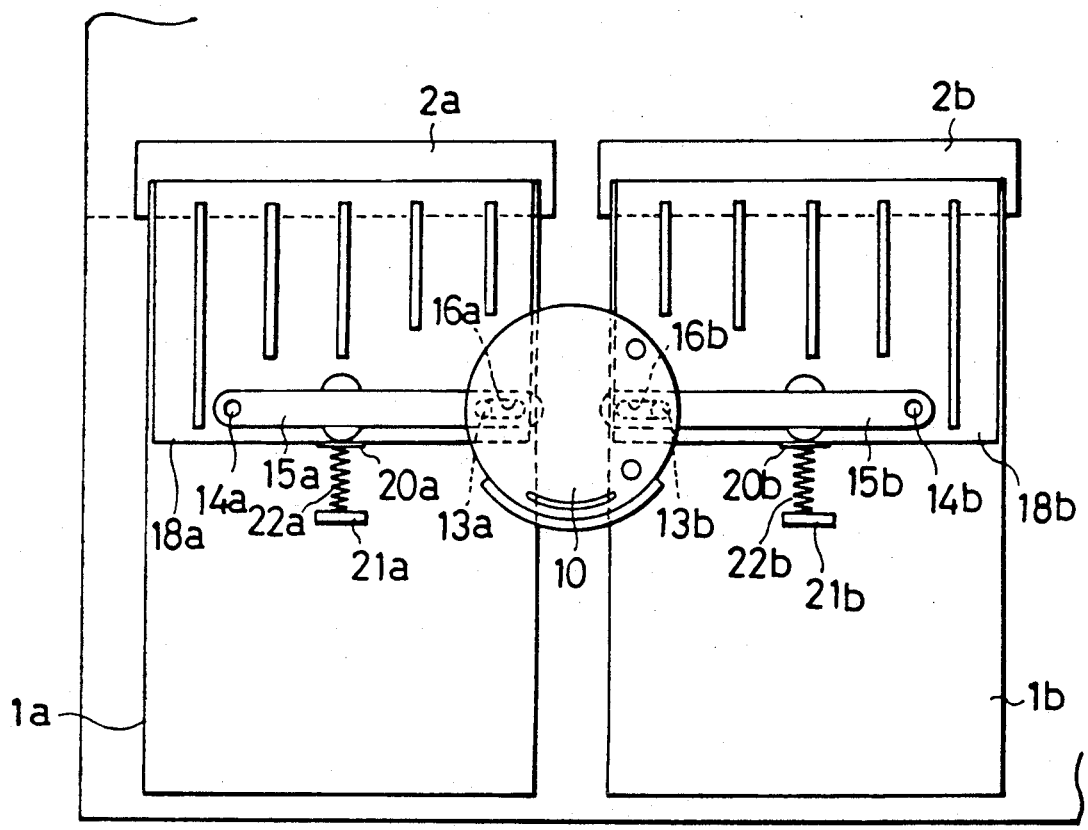
FIG. 2 is a plan view of the IC card ejecting device in accordance with an embodiment of the present invention.
Figure 3:
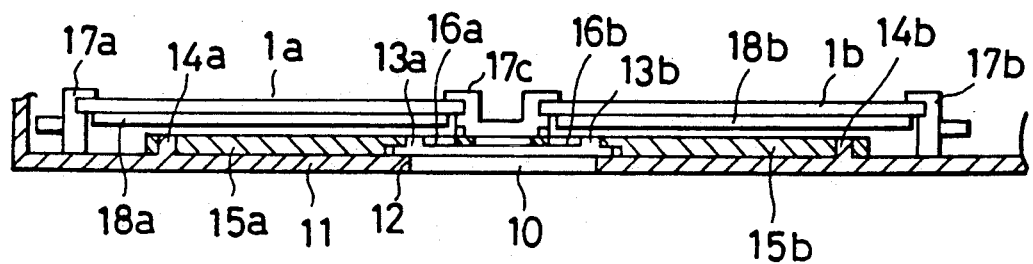
FIG. 3 is a sectional view of the IC card ejecting device of FIG. 2.
Figure 4:
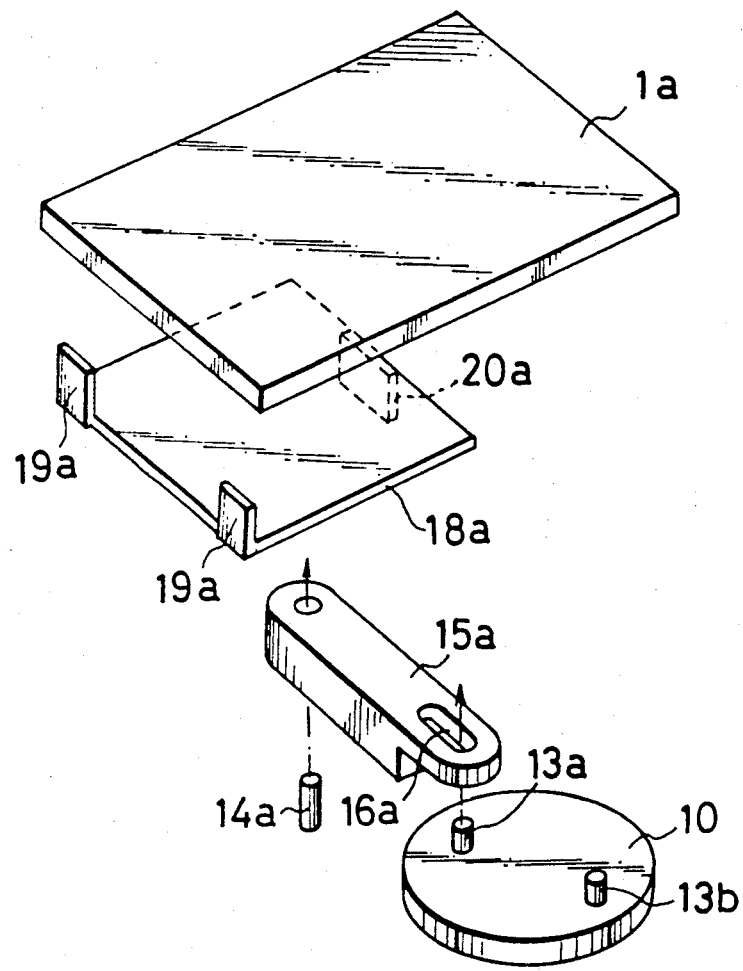
FIG. 4 is an explosive view of the main portion of the IC card ejecting device of FIG. 2.
Figure 5:
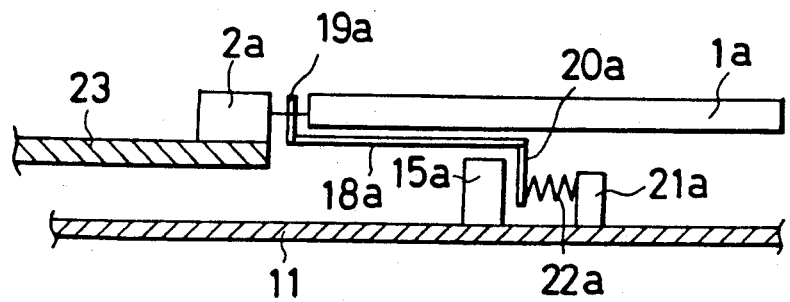
FIG. 5 is a sectional view of the main portion of the IC card ejecting device of FIG. 4.
Figure 6:
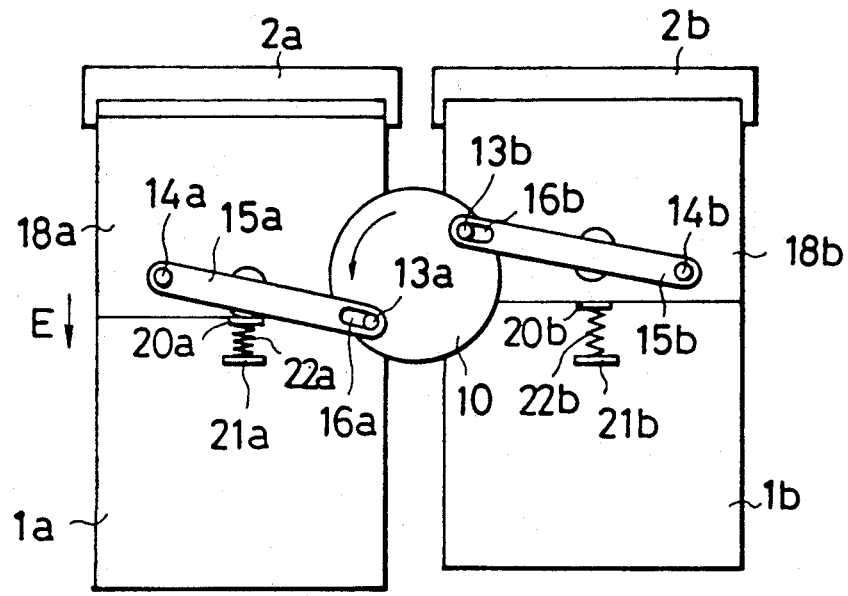
FIG. 6 is an explanatory view of the IC card ejecting device of FIG. 2 for explaining the function thereof to pull out one of the IC cards.
Figure 7:
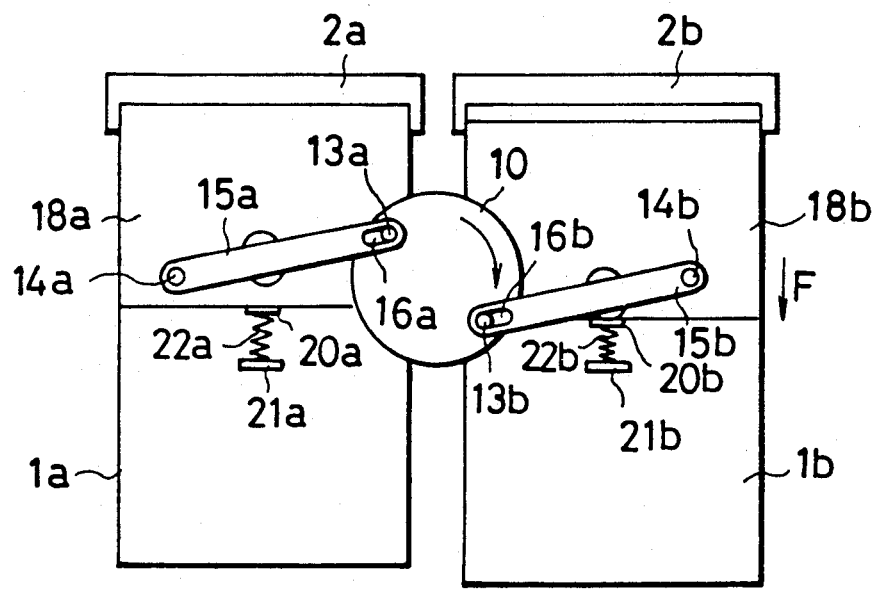
FIG. 7 is an explanatory view of the IC card ejecting device of FIG. 2 for explaining the function thereof to pull out the other of the IC cards.

FIGS. 2 to 7 illustrate the embodiment of the invention. FIG. 2 illustrates the IC card ejecting device seen from the bottom side thereof removing the bottom cabinet of the device. FIG. 3 illustrates the vertical section of the ejecting device. FIG. 4 illustrates the main portion of the device. FIG. 5 illustrates the vertical section of the main portion of FIG. 4. And FIGS. 6 and 7 are explanatory plan views of the device in the state of being operated to eject the different IC cards, respectively.

A disc like dial 10 is disposed at a position between and below two IC cards 1a and 1b. The dial 10 is fittingly and rotatably inserted in a guide hole 12 formed in the bottom cabinet 11, as illustrated in FIG. 3, in such a way that the dial can be manipulated from outside.

Near the outer rim of the dial 10 and on the upper side thereof, a pair of actuating pins 13a and 13b are implanted. A pair of pivots 14a and 14b are formed on the cabinet 11. A pair of eject links 15a and 15b are rotatably installed on the pivots 14a and 14b, respectively. Each link 15a, 15b is pivotted on the pivot 14a, 14b at an end thereof and has an oval guide hole 16a, 16b formed at the other end thereof. Each of the pins 13a and 13b of the dial 10 is slidably inserted in the oval hole 16a, 16b. Therefore, the dial 10 is rotatable only within a rotational range which corresponds to the movable length of each pin 13a, 13b within each guide hole 16a, 16b.

The IC cards 1a and 1b are slided and inserted through guide grooves of card guides 17a, 17b and 17c, as illustrated in FIG. 3, to the connectors 2a and 2b, respectively. An eject plate 18a, 18b is disposed below each IC card 1a, 1b. Each plate 18a, 18b has catch pieces 19a, 19b (only pieces 19a of the plate 18a are illustrated in FIG. 4) cranked upward at both ends of an edge thereof to hook the IC card and pull it out. Also, the plate 18a, 18b has a tongue 20a, 20b cranked downward at the center of the opposite edge thereof. The cabinet 11 has uprights 21a and 21b formed thereon corresponding to the tongues 20a and 20b, respectively (only the upright 21a is illustrated in FIG. 5). A helical compression spring 22a, 22b is disposed between the tongue 20a, 20b of the plate 18a, 18b and the upright 21a, 21b of the cabinet 11, so that the plate 18a, 18b is urged toward the connector 2a, 2b and pressed thereto. Numeral 23 in FIG. 5 designates a printed circuit board on which the connectors 2a and 2b are mounted.

The function of the IC card ejecting device having the structure mentioned above is described below.

In the normal state, each plate 18a, 18b is pressed to the connector side due to the spring force of the compression spring 22a, 22b. Also, each spring urges the tongue 20a, 20b of the plate 18a, 18b against the link 15a, 15b. Since the spring force of the springs 22a and 22b are the same each other, the two links 15a and 15b are balanced to take a position perpendicular to the longitudinal direction of the IC card, as illustrated in FIG. 2.

In the event that the IC card 1a in the left side of FIG. 2 is to be ejected, the dial 10 is rotated couterclockwise, as illustrated in FIG. 6, so that the link 15a is rotated clockwise about the pivot 14a due to the function of the pin 13a sliding within the oval hole 16a of the link 15a. The link 15a which is rotated clockwise then presses the tongue 20a of the plate 18a in the direction of an arrow E while simultaneously pressing the spring 22a in the compressing direction through the tongue 20a. Accordingly, the plate 18a is moved in the direction of arrow E away from the connector 2a so that the IC card 1a is pulled out from the connector 2a by the catch pieces 19a (FIGS. 4 and 5) of the plate 18a.

During the motion of ejecting the IC card 1a mentioned above, the other link 15b is rotated clockwise about the pivot 14b and moved away from the tongue 20b of the plate 18b. Therefore, the link 15b acts nothing on the plate 18b which is being pressed to the connector 2b and maintained stationary. Thus, only the IC card 1a is pulled out by rotating the dial 10 in the couterclockwise direction. After that, when the dial 10 is released, the compressed spring 22a pushes back the link 15a and restores the dial 10 to the initial position of FIG. 2.

Also, in the event that the other IC card 1b is to be pulled out, the device functions substantially in the same way as mentioned above. That is, as illustrated in FIG. 7, the dial 10 is rotated in the clockwise direction this time, so that the pin 13b of the dial 10 slides within the oval hole 16b of the link 15b and rotates the link 15b in the counterclockwise direction about the pivot 14b. The link 15b then presses the tongue 20b of the plate 18b in the direction of an arrow F away from the connector 2b while simultaneously pressing the spring 22b in the compressing direction through the tongue 20b. Accordingly, the plate 18b is moved away from the connector 2b so that the IC 1b is pulled out from the connector 2b by the catch pieces 19b of the plate 18b which are engaging with the edge of the IC card 1b.

During the motion of ejecting the IC card 1b mentioned above, the other link 15a is rotated couterclockwise about the pivot 14a and moved away from the tongue 20a of the plate 18a. Therefore, the link 15a acts nothing on the plate 18a which is being pressed to the connector 2a and maintained stationary. Thus, only the IC card 1b is pulled out by rotating the dial 10 in the clockwise direction. After that, when the dial 10 is released, the compressed spring 22b pushes back the link 15b and restores the dial 10 to the initial position of FIG. 2.

Many widely different embodiments of the present invention may be constructed without departing from the spirit and scope of the present invention. It should be understood that the present invention is not limited to the specific embodiment described in the specification, except as defined in the appended claims.

What is claimed is:

1. An IC card ejecting device for selectively ejecting one of two IC cards which are inserted in each of two connectors and are disposed in parallel to each other side by side, the device comprising:

a manipulation means for ejecting one of said two IC cards, which means is disposed at a position between said two IC cards and is movable in a first direction for ejecting one of said two IC cards and in a second direction opposite to said first direction for ejecting the other of said two IC cards;

a first pulling out means having a hook means which engages with one of said two IC cards;

a second pulling out means having a hook means which engages with the other of said two IC cards;

a first link means arranged between said manipulation means and said first pulling out means in such a way that said first link means engages with said first pulling out means and urges said first pulling out means in a direction of pulling out said one of said two IC cards from one of said two connectors when said manipulation means is moved in said first direction; and a second link means arranged between said manipulation means and said second pulling out means in such a way that said second link means engages with said second pulling out means and urges said second pulling out means in a direction of pulling out said other of said two IC cards from the other of said two connectors when said manipulation means is moved in said second direction.

2. An IC card ejecting device according to claim 1, wherein said manipulation means comprises a disc shaped dial rotatably disposed at a position between said two IC cards.

3. An IC card ejecting device according to claim 2, wherein each of said first and second link means comprises a lever shaped link member pivotably attached to a device frame at an end thereof and having an oval hole formed in the other end thereof, said disc shaped dial including means being slidably inserted in the oval holes formed in said link members so that said link members are pivotted by rotating said disc shaped dial.

4. An IC card ejecting device according to claim 3, wherein each of said first and second link means further comprises a spring means which is arranged to press said pulling out means to said connectors.

5. An IC card ejecting device according to claim 4, wherein each of said pulling out means comprises an eject plate superposingly arranged on said two IC cards and having a hook means for catching said two IC cards at an edge thereof and a tongue piece formed at the other edge thereof to which piece said spring applies its spring force.

6. An IC card ejecting device according to claim 5, wherein said first and second link members are connected to said dial on the opposite sides thereof, respectively, with respect to a rotational center thereof so that said link members are pivotted in the directions opposite to each other when said dial is rotated in either direction.

* * * * *